Figure 1:
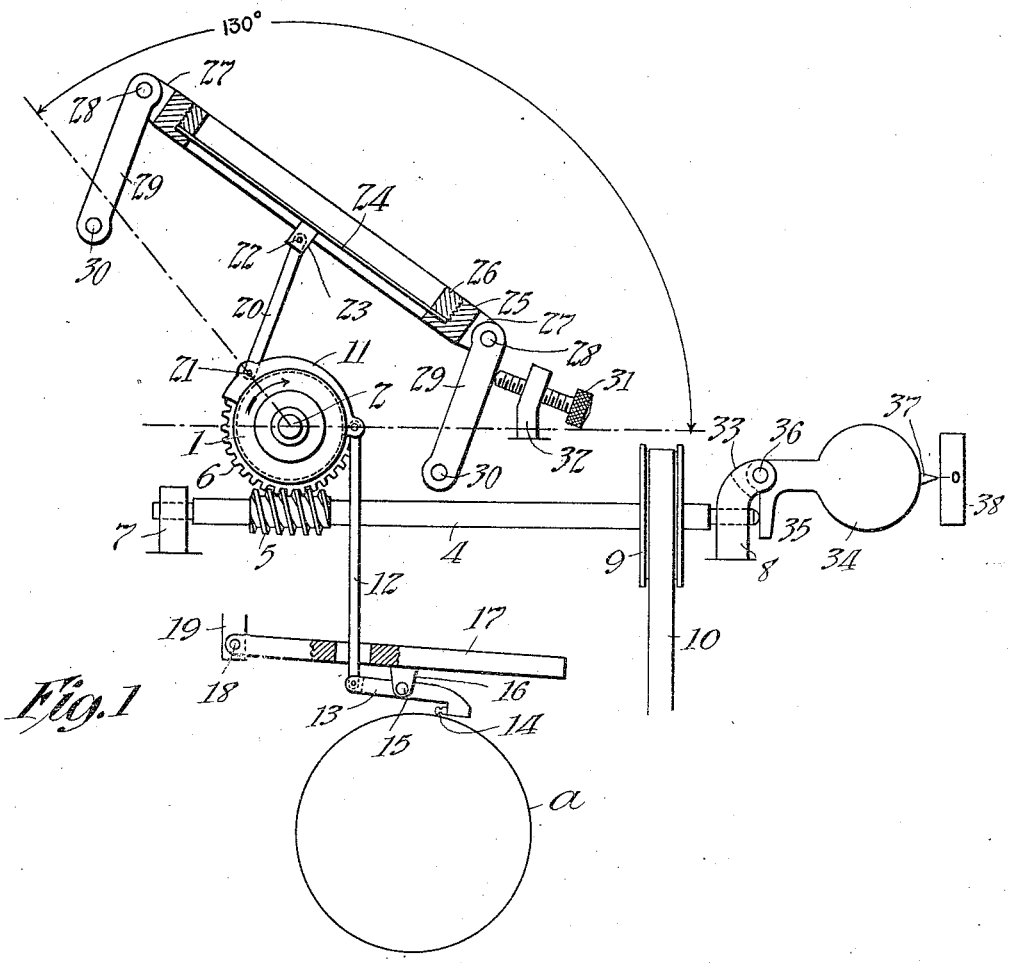

D. HIGHAM.
PHONIC APPARATUS.
APPLICATION FILED APR. 17, 1908.

1,036,235.

Patented Aug. 20, 1912.

Witnesses:
Frank D. Lewis
John M. Canfield

Inventor:
Daniel Higham
by Frank L. Dyer
Atty.

UNITED STATES PATENT OFFICE.

DANIEL HIGHAM, OF EAST ORANGE, NEW JERSEY.

PHONIC APPARATUS.

1,036,235.  Specification of Letters Patent.  Patented Aug. 20, 1912.

Application filed April 17, 1908. Serial No. 427,703.

*To all whom it may concern:*

Be it known that I, DANIEL HIGHAM, a citizen of the United States, and a resident of East Orange, in the county of Essex and State of New Jersey, have invented certain new and useful Improvements in Phonic Apparatus, of which the following is a description.

My invention relates to phonic apparatus of the type in which a shoe is held in frictional engagement with the periphery of a rotating wheel of suitable material, such as amber, and the pressure of said shoe upon said wheel is varied by any suitable means which is representative of sound vibrations and which may be termed the primary vibrating means, as for example, a reproducer stylus capable of being operated by a phonograph sound record. Such variations in pressure cause corresponding variations in the friction between the wheel and shoe, thereby causing the shoe to vibrate in accordance with the sound vibrations and such movements of the said shoe may be transmitted by any suitable mechanical connection to a diaphragm or other means for propagating the effects of such variations in friction and which may be termed the secondary vibrating means. In this class of apparatus the friction shoe in frictional contact with the rotating friction wheel has a certain angular extension with respect to the periphery of the friction wheel and it is desirable that the angle of such extension should be considerable so that the shoe will have a tendency to "bite" or bind upon the friction wheel. The required amount of this circumferential extension or the degree of mechanical bite of the shoe must, in order to obtain the best results, vary inversely with the coefficient of friction of the frictional contact of the shoe and rotating wheel; that is, a lower coefficient of friction will require a greater circumferential extension or a stronger bite, and a higher coefficient will require correspondingly less extension or bite to obtain equal results from this type of apparatus. In such apparatus, however, the amount of circumferential extension of the friction shoe cannot be readily varied, although owing to varying atmospheric conditions which always affect the coefficient of friction, the latter continually varies so that it has heretofore been impossible to secure uniformly good results with this type of apparatus.

It is the object of this invention to provide means whereby variations in coefficient of friction can be readily compensated for, such means acting to vary or adjust the degree of the mechanical bite of the friction shoe upon the rotating friction wheel.

In order that my invention may be more fully understood, reference is hereby made to the accompanying drawing, of which—

Figure 2:
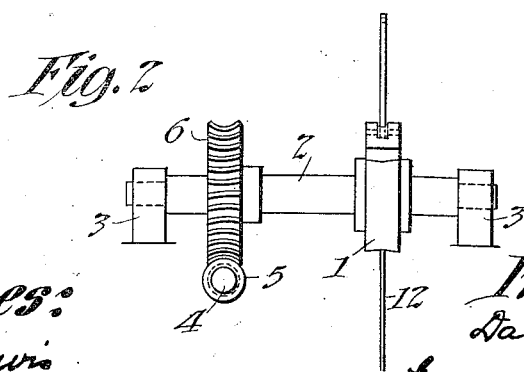

Figure 1 is a side elevation, partly in section, of an apparatus constructed in accordance with my invention and adapted to be used as a phonograph reproducer, and Fig. 2 is a view of certain of the parts as viewed from the left in Fig. 1.

In the apparatus shown, the friction wheel 1, preferably of amber, is mounted on the horizontal shaft 2 which is journaled in suitable bearings 3 and driven in the direction of the arrow by a shaft 4 formed with a worm 5 which engages a worm gear 6 fixed to the shaft 2. The shaft 4 is journaled in bearings 7 and 8 and is provided with a pulley 9 over which passes a drive belt 10. The friction shoe 11 is applied to the periphery of the wheel 1, and there is a link 12 pivoted at one end to the shoe 11, and at the other end to a stylus lever 13 which carries a phonograph reproducer stylus 14 adapted to track the sound record groove of the record cylinder *a* which is rotated and advanced by usual means. The lever 13 is pivoted at 15 to a lug 16 depending from a weight 17 which is pivoted at 18 to a support 19. The weight 17 is similar to the ordinary floating weight of an Edison reproducer. There is a thrust link or coupling 20 pivoted at 21 to the shoe 11 and at 22 to a head 23 secured to the center of a diaphragm 24 of mica or other suitable material. The diaphragm 24 is seated within the frame 25 and secured in position by the clamping ring 26. The forward and rear edges of the frame 25 are provided with lugs 27 to which at 28 are pivoted the links 29. The lower ends of said links are pivoted at 30 to any suitable support, and the angular position of the links 29 with respect to their support and of the link 20 with respect to the shoe 11 and wheel 1, is determined and may be varied by an adjusting screw 31 which is threaded in the support 32. The bearing 8 has an extension 33 to which is pivoted at 36 a weight 34 having a depending arm 35 which bears against the end of the shaft 4. This weight carries an index finger 37 which coöperates with a fixed scale 38 to indicate the rise and fall in the amount of thrust imparted to the shaft 4 in driving the friction wheel 1, the friction shoe 11 being pressed against the periphery of the friction wheel by the tension of the link 12 due to gravity of the weight 17. From the drawing it will be seen and understood that the link 20 will impart a mechanical bite tendency to the shoe 11 owing to its angular disposition in relation to the friction wheel 1. The varying or adjusting of this angle of link 20 which in turn varies or adjusts the mechanical bite tendency of the friction shoe, and thereby compensates for variations in the coefficient of friction of the frictional contact of the friction shoe with the rotating friction wheel is an important feature of my invention. It will be further seen from the drawing that link 20 and links 29 are parallel and of equal length and therefore, the angle of link 20 in relation to the friction wheel 1, can be readily adjusted without changing the position of the friction shoe on the friction wheel, for the adjusting screw 31 in swinging links 29 about the pivotal points of support 30 swings the link 20 about the point 21 on shoe 11 without changing the position of the friction shoe.

The structure illustrated represents the arrangement of an apparatus capable of producing good results. It is evident, however, that various changes may be made in the shapes and arrangements of the different parts, without departing from the spirit of my invention.

In practising my invention, the coefficient of friction of the frictional surfaces may be approximately .75, and the active portion of the angular extension of the frictional shoe around the friction wheel 130° (see Fig. 1). In case a lower coefficient of friction is used the angular extension of the shoe should be increased and in case a higher coefficient is used the angular extension should be decreased. When the apparatus is in proper adjustment the resistance of the wheel 1 to rotation will impart a sufficient thrust to the shaft 4 to move and sustain the weight 34 whereby the index finger 37 will designate the zero mark on the scale 38. When the amount of friction falls below that which is requisite the weight 34 will descend which indicates that the apparatus is out of adjustment owing to fall in the coefficient of friction and the adjusting screw 31 will then be turned so as to move inward, thereby increasing the bite of the shoe on the friction wheel and compensating for the fall in the coefficient of friction and which compensation will be indicated by the rising of the weight 34 to the proper position. On the other hand if the weight 34 is seen to be above its proper working position this indicates that the apparatus is out of adjustment owing to excessive friction or bite of the shoe upon the wheel and is corrected by turning the adjusting screw 31 so as to cause the link 20 to move toward a line tangent to the friction wheel. The amount of friction developed depends both upon the angular extent of the friction shoe around the wheel 1 and upon the angle of the link 20, so that it is possible by using a somewhat different angle of said link to use a shoe of more or less than 130° with the same coefficient of friction and with the same tension on the link 12, but I prefer the arrangement shown and described.

The weight 17 should be of proper size for causing the stylus 14 to properly track the sound record groove of the cylinder $a$, as in an Edison phonograph reproducer, and the total thrust upon the shaft 4 due to the resistance of the friction wheel may be approximately seven times the tension on the link 12 when the relative diameters of the friction wheel 1 and gear 6 are as shown. If the diameter of the wheel 1 is increased or that of the gear 6 decreased the thrust upon the shaft 4 will be correspondingly increased and vice versa when the diameter of the wheel 1 is decreased or that of the gear 6 increased.

Having now described my invention, what I claim is:

1. In an apparatus of the character described, the combination of a rotating friction wheel, a shoe engaging the same, a floating weight, a stylus lever pivoted to said weight, a connection between said weight and said shoe through which the said weight acts upon said shoe to press the same against the friction wheel, a thrust member secured to said shoe and pressing the same against the wheel when the latter is rotating, and means for varying the pressure so exerted, substantially as set forth.

2. In an apparatus of the character described, the combination of a rotating friction wheel, a shoe in engagement with the upper surface thereof, a diaphragm connected to said shoe, a floating weight and a stylus lever and stylus carried thereby and connected to said shoe whereby the floating weight tends to press the shoe down upon the friction wheel, substantially as set forth.

3. In an apparatus of the character described, the combination of a rotating friction wheel, a shoe in engagement with the upper surface thereof, secondary vibrating means connected to said shoe, a floating weight and a lever pivoted to said weight and connected to said shoe whereby the floating weight tends to press the shoe down upon the friction wheel, substantially as set forth.

4. In an apparatus of the character described, the combination of a rotating friction wheel, a shoe in engagement therewith, secondary vibrating means, means for coupling said secondary vibrating means to said shoe and means for varying the angle of said coupling with respect to said friction wheel to vary the bite of said shoe on said wheel, substantially as set forth.

5. In an apparatus of the character described, the combination of a rotating friction wheel, a shoe in engagement therewith, a diaphragm, a coupling connected to said diaphragm and pivoted to said shoe, and means for adjusting the position of said diaphragm to vary the angle of said coupling with respect to said friction wheel to vary the bite of said shoe on said wheel, substantially as set forth.

6. In an apparatus of the character described, the combination of a rotating friction wheel, a shoe in engagement therewith, secondary vibrating means connected to said shoe and an adjustable support therefor for varying the angle of the connection of the secondary vibrating means with said shoe to vary the bite of said shoe on said wheel, substantially as set forth.

7. In an apparatus of the character described, the combination of a rotating friction wheel, a shoe in engagement therewith, secondary vibrating means, a link pivotally connected to said shoe and said secondary vibrating means, and a support for the latter adjustable to move to different positions to vary the angular position of said link to vary the bite of said shoe on said wheel, and means for holding said support in a desired position, substantially as set forth.

8. In an apparatus of the character described, the combination of a rotating friction wheel, a shoe in engagement therewith, secondary vibrating means, a link pivotally connected to said shoe and said secondary vibrating means, and a support for the latter comprising pivotal links approximately parallel and equal in length to said connecting link, substantially as set forth.

9. In an apparatus of the character described, the combination of a rotating friction wheel, a shoe in engagement therewith, means for varying the friction between said shoe and wheel in accordance with sound vibrations, means for rotating said wheel and means for indicating under all conditions of operation the resistance of said wheel against rotation, substantially as set forth.

10. In an apparatus of the character described, the combination of a rotating friction wheel, a shoe in engagement therewith, a shaft, means supporting said shaft to allow some axial movement thereof, a worm gear on said shaft, a worm meshing with said worm gear, means for rotating said worm, means for varying the friction between said shoe and wheel in accordance with sound vibrations and means for indicating the thrust imparted to said worm by the resistance against rotation of the friction wheel, substantially as set forth.

11. In an apparatus of the character described, the combination of a rotating friction wheel, a shoe in engagement therewith, means for rotating said wheel, primary vibrating means adapted to vibrate in accordance with sound vibrations, secondary vibrating means, connections between each of the said vibrating means and said shoe, and means for indicating under all conditions of operation the resistance of said wheel against rotation, substantially as set forth.

12. In an apparatus of the character described, the combination of a rotatable friction wheel, a shoe in engagement therewith, means for varying the friction between said shoe and wheel in accordance with sound vibrations, means for rotating said wheel including a shaft mounted to allow some axial movement thereof and so positioned as to be given a thrust by the resistance against rotation of the friction wheel, and means for measuring the thrust thus imparted substantially as set forth.

13. In an apparatus of the character described, the combination of a rotatable friction wheel, a shoe in engagement therewith, means for varying the friction between said shoe and wheel in accordance with sound vibrations, means for rotating said wheel including a shaft mounted to allow some axial movement thereof and so positioned as to be given a thrust by the resistance against rotation of the friction wheel, means resisting the axial movement of said shaft due to such thrust, and means for indicating the amount of such resistance, substantially as set forth.

14. In an apparatus of the character described, the combination of a rotatable friction wheel, a shoe in engagement therewith, means tending to press said shoe against said wheel, means for varying the pressure of said shoe upon said wheel in accordance with sound vibrations, and means for indicating under all conditions of operation the resistance of said wheel against rotation, substantially as set forth.

This specification signed and witnessed this 15th day of April 1908.

DANIEL HIGHAM.

Witnesses:
H. H. DYKE,
FRANK D. LEWIS.

Copies of this patent may be obtained for five cents each, by addressing the "Commissioner of Patents, Washington, D. C."